(12) United States Patent
Okura et al.

(10) Patent No.: US 7,651,329 B2
(45) Date of Patent: Jan. 26, 2010

(54) EXHAUST GAS PROCESSING DEVICE, AND METHOD OF USING THE SAME

(75) Inventors: Hajime Okura, Kure (JP); Toshio Katsube, Kure (JP); Takayuki Saito, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 439 days.

(21) Appl. No.: 10/541,153

(22) PCT Filed: Jan. 29, 2004

(86) PCT No.: PCT/JP2004/000872

§ 371 (c)(1),
(2), (4) Date: Jun. 30, 2005

(87) PCT Pub. No.: WO2004/068034

PCT Pub. Date: Aug. 12, 2004

(65) Prior Publication Data

US 2006/0088452 A1    Apr. 27, 2006

(30) Foreign Application Priority Data

Jan. 31, 2003 (JP) ............................. 2003-024214

(51) Int. Cl.
*F23D 14/00* (2006.01)

(52) U.S. Cl. .................. 431/5; 431/2; 431/3; 431/6; 422/168; 422/169; 423/243.01

(58) Field of Classification Search ................ 431/121, 431/2, 3, 6, 202, 5; 110/203, 345; 422/168, 422/169, 176; 423/243.01; 95/235; 96/271

See application file for complete search history.

(56) References Cited

U.S. PATENT DOCUMENTS 4,011,066 A * 3/1977 Bratzler et al. ............ 95/161

(Continued)

FOREIGN PATENT DOCUMENTS

JP        61-38617        2/1986

(Continued)

OTHER PUBLICATIONS

English Language Abstract of JP 2004-85089.

(Continued)

*Primary Examiner*—Kenneth B Rinehart
*Assistant Examiner*—Jorge Pereiro
(74) *Attorney, Agent, or Firm*—Greenblum & Bernstein, P.L.C.

(57) ABSTRACT

In an exhaust gas processing device wherein in order to efficiently outwardly discharge heat at high temperatures of about 90-150° C. released from a GGH reheater during the shutdown of a desulfurizer, to prevent damage to equipment and corrosion preventive lining material, and to ensure long-term stabilized use of the exhaust gas processing device, at least a GGH heat recovery unit, an absorption tower, a mist eliminator (M/E), and the GGH reheater are placed in a duct for exhaust gases discharged from a fire furnace, in the order named as seen from the upstream side of a flow of exhaust gases, an exhaust gas duct between the M/E and the reheater is provided with a heat radiation device or the like having a heat suppression function for suppressing dissipated heat from the reheater.

7 Claims, 6 Drawing Sheets

U.S. PATENT DOCUMENTS

| | | | | |
|---|---|---|---|---|
| 4,239,711 | A | * | 12/1980 | Dick et al. ................ 261/109 |
| 4,249,916 | A | * | 2/1981 | Dick et al. ................... 95/96 |
| 4,286,528 | A | * | 9/1981 | Willard ..................... 110/203 |
| 4,300,920 | A | * | 11/1981 | Grove ........................ 95/227 |
| 4,882,020 | A | * | 11/1989 | Maezawa et al. ......... 204/157.3 |
| 4,919,696 | A | * | 4/1990 | Higashi et al. .............. 55/434.4 |
| 5,108,565 | A | * | 4/1992 | Machi et al. ............. 204/157.3 |
| 5,429,808 | A | * | 7/1995 | Kuroda et al. ............... 422/176 |
| 5,595,713 | A | * | 1/1997 | Gohara et al. ............... 422/170 |
| 5,648,048 | A | * | 7/1997 | Kuroda et al. ............... 422/168 |
| 5,723,838 | A | * | 3/1998 | Shin et al. ................ 204/157.3 |
| 5,840,263 | A | * | 11/1998 | Shinoda et al. ........ 423/243.01 |
| 5,879,639 | A | * | 3/1999 | Tatani et al. ................ 422/168 |
| 5,958,335 | A | * | 9/1999 | Okazoe et al. ................ 422/13 |
| 6,001,321 | A | * | 12/1999 | Okazoe et al. ......... 423/243.01 |
| 6,007,783 | A | * | 12/1999 | Ochi et al. .................. 422/171 |
| 6,051,055 | A | * | 4/2000 | Ukawa et al. ................. 96/322 |
| 6,096,279 | A | * | 8/2000 | Iwashita et al. .......... 423/242.1 |
| 6,138,378 | A | * | 10/2000 | Takashina et al. ............. 34/379 |
| 6,203,598 | B1 | * | 3/2001 | Hasegawa et al. .............. 95/92 |
| 6,506,348 | B1 | * | 1/2003 | Ochi et al. .................. 422/169 |
| 2002/0044895 | A1 | * | 4/2002 | Nickens et al. .............. 422/168 |

FOREIGN PATENT DOCUMENTS

| | | | |
|---|---|---|---|
| JP | 5-293335 | | 11/1993 |
| JP | 6-238127 | | 8/1994 |
| JP | 06238127 A | * | 8/1994 |
| JP | 2001074229 A | * | 3/2001 |
| JP | 2001327831 A | * | 11/2001 |
| JP | 2002-228139 | | 8/2002 |
| JP | 2002-370012 | | 12/2002 |
| JP | 2004-85089 | | 3/2004 |

OTHER PUBLICATIONS

English Language Abstract of JP 5-293335.
English Language Abstract of JP 2002-370012.
English Language Abstract of JP 2002-228139.
English Language Abstract of JP 6-238127.
U.S. Appl. No. 10/530,471 to Muramoto et al.
English Language Abstract of French Publication No. FR 2564746.

* cited by examiner

F I G. 1
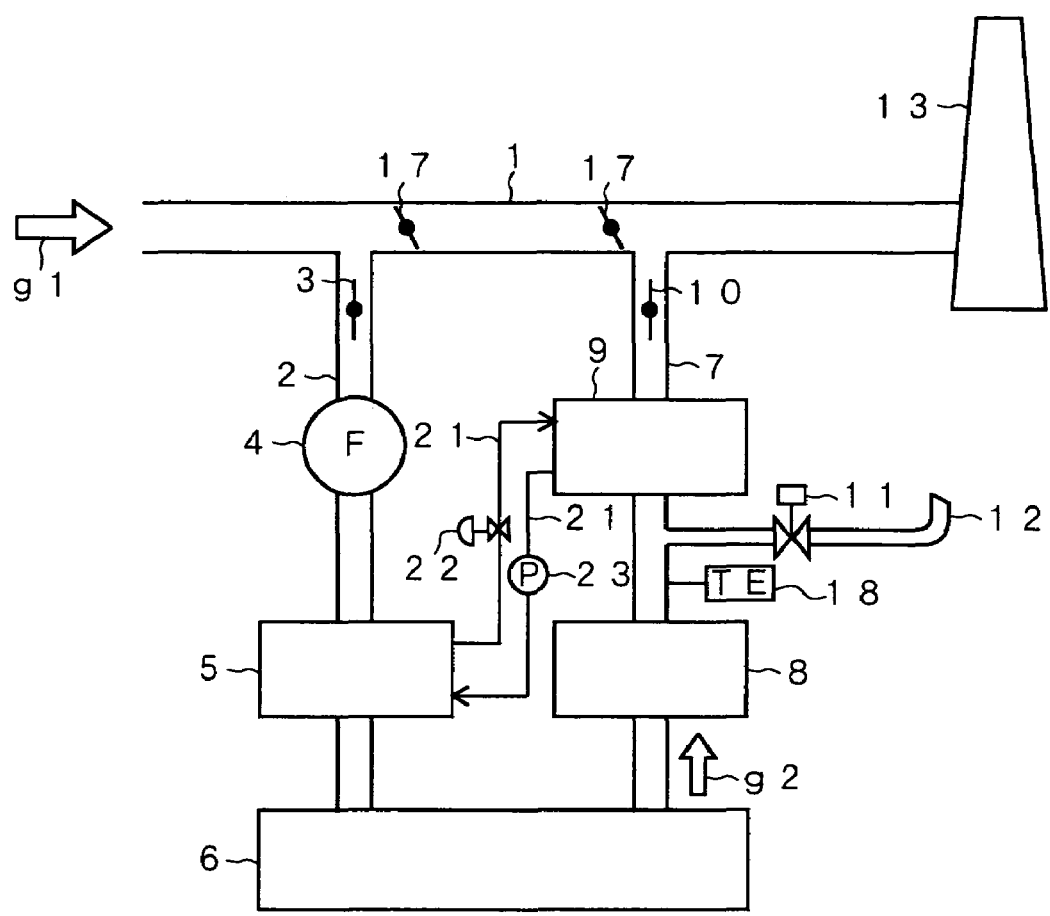

EXHAUST GAS PROCESSING DEVICE, AND METHOD OF USING THE SAME

TECHNICAL FIELD

The present invention relates to an exhaust gas processing device including a combustion exhaust gas desulfurizer of a boiler or the like and a method of using the same, and in particular, it relates to an exhaust gas processing device wherein a heat suppression device preferable in releasing heat released from a nonleak-type gas-gas heater (hereinafter, which may be referred to as a GGH) reheater side or from a steam-gas heater (hereinafter, which may be referred to as an SGH) and a GGH reheater side during a shutdown of a desulfurizer is provided and a method of using the same.

BACKGROUND ART

For prevention of air pollution, as devices for eliminating sulfur oxides in exhaust gases, wet-type limestone-gypsum desulfurizers have been widely put into practical use. A systematic diagram of a prior art (such as Japanese Published Unexamined Patent Application No. H06-238127), which is major equipment of exhaust gas processing devices including desulfurizers, is shown in FIG. 6.

Unprocessed exhaust gas g1 containing sulfur oxides and soot and dust generated from a thermal power plant or the like passes through a desulfurizer inlet duct 2 with an inlet damper 3 from a boiler duct 1, is pressurized by a desulfurization fan 4, and is led to an absorption tower 6 of the desulfurizer through a GGH heat recovery unit 5. The unprocessed exhaust gas g1 makes, in the absorption tower 6, gas-liquid contact in a countercurrent or parallel current with a sprayed adsorption liquid, whereby the sulfur oxides in the exhaust gas are absorbed and eliminated via the surfaces of adsorption liquid droplets, and the soot and dust is physically eliminated by a collision with the liquid droplets. Here, for the boiler duct 1, a duct part to directly pass through the inlet duct 2 and an outlet duct 7 is provided, and bypass dampers 17 and 17 are arranged at this part, and the bypass dampers 17 and 17 are opened when the unprocessed gas g1 is made to bypass the absorption tower 6 and directly flow to a chimney 13.

The minute liquid droplets accompanying the exhaust gas flow pass through the desulfurizer outlet duct 7 and are eliminated by a mist eliminator 8 installed at an outlet of the absorption tower 6, and purified processed exhaust gas g2 is discharged from the chimney 13 into the atmospheric air. At this time, in order to realize an improvement in atmospheric diffusibility of the smoke exhaust and white smoke prevention and in order to realize prevention of low-temperature corrosion of the inner surfaces of the outlet duct 7 and chimney 13, the gas is raised in temperature by a GGH reheater 9, and is then discharged from the chimney 13.

Here, between the nonleak-type GGH heat recovery unit 5 and nonleak-type GGH reheater 9, a heat medium pipeline 21, an opening/closing valve 22 of this pipeline 21, and a heat medium feeding pump 23 are provided.

In the prior art, when operation of the desulfurizer is stopped and the inlet damper 3 of the inlet duct 2 and an outlet damper 10 of the outlet duct 7 are closed, since heat released from the GGH reheater 9 has no escape, the ambient air temperature of the inside of the outlet duct 7 is raised to approximately 90-150° C., and inconveniences such that a resin element of the mist eliminator 8 present at an upstream side of the GGH reheater 9 is deformed by high heat and a thermal degradation occurs on a corrosion preventing lining of the inner surface of the outlet duct 7 have existed.

DISCLOSURE OF THE INVENTION

In the above-described prior art, no escape for the high-temperature residual heat of approximately 90-150° C., which is discharged from the GGH reheater 9 during a shutdown of the desulfurizer, has been taken into consideration and problems such that the resin element of the mist eliminator 8 present in the outlet duct 7 is deformed by high heat and a thermal degradation occurs on the corrosion preventive lining of the inner surface of the outlet duct 7.

An object of the present invention is to efficiently outwardly discharge high-temperature heat of approximately 90-150° C. released from a GGH reheater 9 during a shutdown of a desulfurizer, prevent damage to equipment and corrosion preventing lining material, and ensure long-time stabilized use of an exhaust gas processing device.

The object of the present invention is solved by the following construction.

The first aspect of the invention is an exhaust gas processing device having comprising, in order from the upstream side of an exhaust gas flow direction, at least a nonleak-type gas-gas heater heat recovery unit 5, an absorption tower 6, a mist eliminator 8, and a nonleak-type GGH reheater 9 for circulating a heat medium with respect to the heat recovery unit 5 arranged in a duct for exhaust gas discharged from a fire furnace, wherein in an exhaust gas duct between the mist eliminator 8 and nonleak-type gas-gas heater reheater 9, a heat suppression (heat radiation) device for suppressing dissipated heat from the nonleak-type gas-gas heater reheater 9 is arranged.

According to the above-described construction, even when heat is dissipated from the nonleak-type gas-gas heater reheater 9 during a shutdown of the absorption tower 6, by outwardly discharging the dissipated heat by the heat suppression (heat radiation) device, damage is never given to the equipment made of nonmetallic material of the exhaust gas processing device.

In the exhaust gas processing device of the present invention, a construction can be provided, wherein the exhaust gas duct between the mist eliminator 8 and nonleak-type gas-gas heater reheater 9 is provided with a steam-gas heater 16, and the exhaust gas duct between the mist eliminator 8 and steam-gas heater 16 is provided with a heat suppression device for suppressing dissipated heat from the steam-gas heater 16.

Similarly in the above-described exhaust gas processing device of the present invention provided with the steam-gas heater 16, as well, even when heat is dissipated from the steam-gas heater 16 and nonleak-type gas-gas heater reheater 9 during a shutdown of the absorption tower 6, by outwardly discharging the dissipated heat by the heat suppression (heat radiation) device at an allowable heat temperature or less of the corrosion preventive lining material, damage is never given to the equipment made of nonmetallic material of the exhaust gas processing device.

In addition, as the heat suppression device for suppressing dissipated heat, at least one construction or more of the following (a)-(c) may be provided.

(a) A construction wherein a blow-off device composed of a blow-off valve 11 and a blow-off pipeline 12 or the like is provided in the exhaust gas duct between the mist eliminator 8 and nonleak-type gas-gas heater reheater 9 (in a case provided with a steam-gas heater 16, an exhaust gas duct between the mist eliminator 8 and steam-gas heater 16 and/or an exhaust gas duct between the steam-gas heater 16 and non-leak-type gas-gas heater reheater 9), (b) a construction wherein, in the exhaust gas duct between the mist eliminator 8 and nonleak-type gas-gas heater reheater 9 (in a case provided with a steam-gas heater 16, an exhaust gas duct between the mist eliminator 8 and steam-gas heater 16 and/or an exhaust gas duct between the steam-gas heater 16 and nonleak-type gas-gas heater reheater 9), a thermometer 18 for measuring ambient air temperature of the inside of the exhaust gas duct is installed, and furthermore, at a front surface side and a rear surface side of the mist eliminator 8, a spray nozzle pipeline 19 for washing, when a measured temperature of the thermometer 18 becomes a set temperature or more, an element of the mist eliminator 8 and/or an exhaust gas duct inner wall surface and the periphery thereof with a washing liquid and an opening/closing valve 22 of this pipeline 19 are provided, and (c) a construction wherein, on an element of the mist eliminator 8, an absorption tower outlet duct, an exhaust gas duct between the absorption tower 6 and mist eliminator 8, and/or an exhaust gas duct between the mist eliminator 8 and nonleak-type gas-gas heater reheater 9 (in a case provided with a steam-gas heater 16, an exhaust gas duct between the mist eliminator 8 and steam-gas heater 16 and/or an exhaust gas duct between the steam-gas heater 16 and nonleak-type gas-gas heater reheater 9), a heat-resistant resin material and/or a corrosion preventive lining material resistant to dissipated heat from the nonleak-type gas-gas heater reheater 9 (in a case provided with a stem-gas heater 16, including dissipated heat from the steam-gas heater 16) during a shutdown of the absorption tower 6 is provided.

According to the above-described constructions, in a case of the above-described (a), heat in the exhaust gas duct is radiated from the blow-off valve 11 and blow-off pipeline 12 or the like.

In a case of (b), when a measured temperature of the thermometer 18 becomes a set temperature or more, a washing liquid for washing an element of the mist eliminator 8 and/or an exhaust gas duct inner wall surface and the periphery thereof is sprayed from the spray nozzle pipeline 19.

(c) On an element of the mist eliminator 8, an absorption tower outlet duct, an exhaust gas duct between the absorption tower 6 and mist eliminator 8, and/or an exhaust gas duct between the mist eliminator 8 and nonleak-type gas-gas heater reheater 9 (in a case provided with a steam-gas heater 16, an exhaust gas duct between the mist eliminator 8 and steam-gas heater 16 and/or an exhaust gas duct between the steam-gas heater 16 and nonleak-type gas-gas heater reheater 9), a heat-resistant resin material and/or a corrosion preventive lining material resistant to dissipated heat from the nonleak-type gas-gas heater reheater 9 (in a case provided with a stem-gas heater 16, including dissipated heat from the steam-gas heater 16) during a shutdown of the absorption tower 6 is provided.

Accordingly, damage is never given to the equipment made of nonmetallic material of the exhaust gas processing device.

The absorption tower 6 in the fifth aspect of the invention may be a two-chamber-type absorption tower provided with (a) a circulation tank for retaining of an absorption liquid, and (b) spray nozzles 23 for spraying an absorption liquid slurry in respective regions, while an inlet duct 2 for introducing exhaust gas discharged from a combustion device such as a boiler in almost a horizontal direction and an outlet duct 7 for discharging exhaust gas in almost a horizontal direction are provided above this circulation tank, an exhaust gas channel is provided between the inlet duct 2 and outlet duct 7, a partition plate 20 stood in a vertical direction having an opening portion at a ceiling portion side to divide this exhaust gas channel into two chambers of an inlet duct side and an outlet duct side is provided, and an ascending current region where exhaust gas introduced from the inlet duct 2 flows upward and a descending current region where exhaust gas flows downward toward the outlet duct 7 after reversing at the opening portion of the ceiling side are formed by this partition plate 20, so that the ejecting absorption liquid slurry makes countercurrent contact with exhaust gas in the ascending current region and makes parallel-current contact in the descending current region.

By use of the two-chamber-type absorption tower, an advantage is provided in that the smoke exhaust desulfurizing process can be carried out in a relatively small space.

In addition, the sixth aspect of the invention is a method of using the exhaust gas processing device according to the first aspect, wherein the heat suppression device is activated so as to suppress dissipated heat from the nonleak-type gas-gas heater reheater 9 generated during a shutdown of the adsorption tower.

The seventh aspect of the invention is a method of using the exhaust gas processing device according to the third aspect, wherein, when a measured value of the thermometer 18 for measuring ambient air temperature of the exhaust gas duct between the mist eliminator 8 and nonleak-type gas-gas heater reheater 9 and/or between the mist eliminator 8 and steam-gas heater 16 becomes a set value or more during a shutdown of the absorption tower, the opening/closing valve of the spray nozzle pipeline 19 is activated, and the washing liquid is sprayed from the spray nozzle pipeline 19 onto the element of the mist eliminator 8 and the periphery thereof.

BRIEF DESCRIPTION OF DRAWINGS

FIG. 1 is a diagram showing a system of the main construction of an exhaust gas processing device of an embodiment of the present invention.

BEST MODE FOR CARRYING OUT THE INVENTION

Hereinafter, an embodiment of the present invention will be described by use of the drawings.

Figure 2:
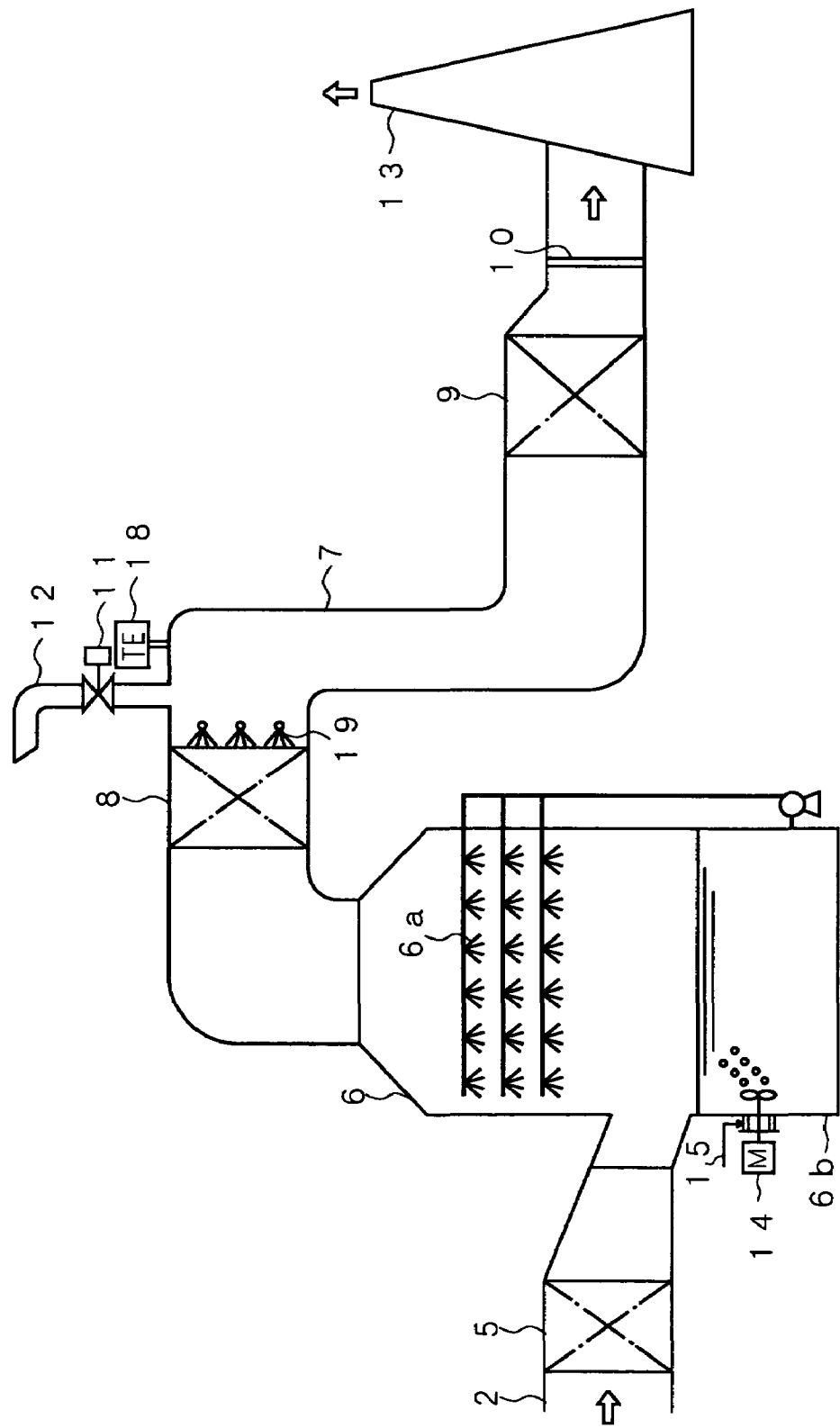
FIG. 2 is a diagram showing an arrangement of the main construction of an exhaust gas processing device of an embodiment of the present invention.

FIG. 1 shows a systematic diagram of the main equipment of an exhaust gas processing device provided with a heat suppression device of the present embodiment, and FIG. 2 shows the systematic diagram shown in FIG. 1 in a form of the layout diagram.

Figure 6:
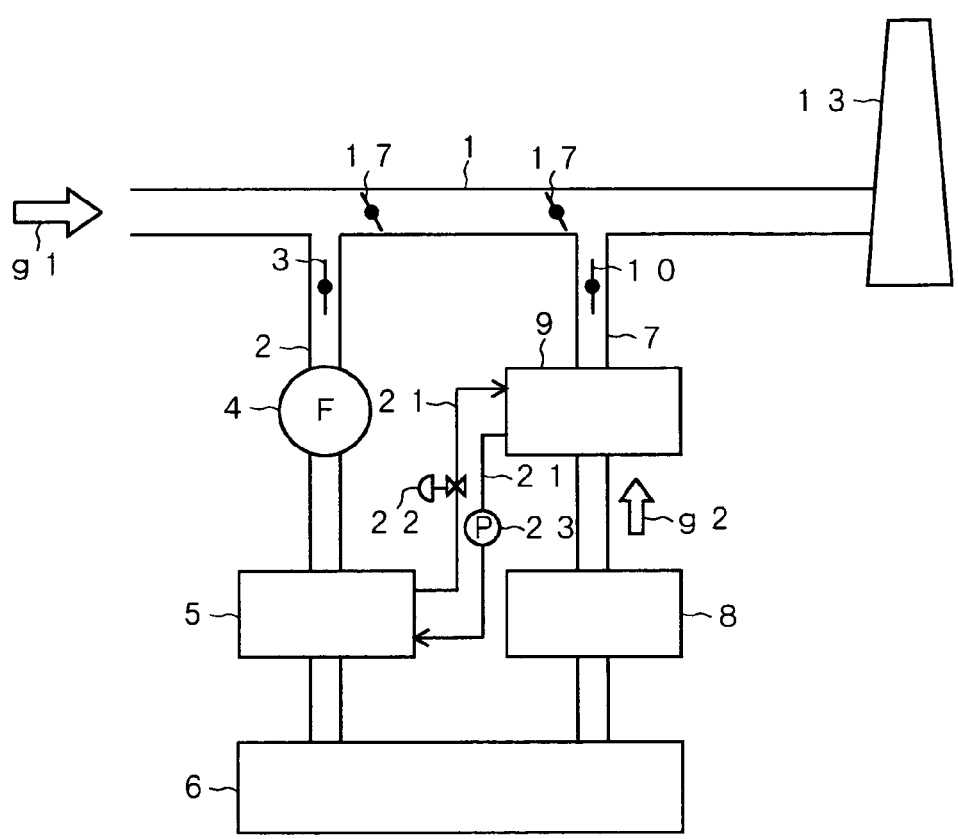
FIG. 6 is a diagram showing a system of the main construction of an exhaust gas processing device of a prior art.

The construction of a system of the whole exhaust gas processing device is the same as that of a system described in FIG. 6, wherein unprocessed exhaust gas g1 containing sulfur oxides and soot and dust generated from a thermal power plant or the like passes through an inlet duct 2 with an inlet damper 3 from a boiler duct 1, is pressurized by a desulfurization fan 4, and is led to an absorption tower 6 of a desulfurizer by way of a nonleak-type GGH heat recovery unit 5. The sulfur oxides in the unprocessed exhaust gas g1 are absorbed and eliminated by a sprayed adsorption liquid in the absorption tower 6 of the desulfurizer, and the soot and dust is physically eliminated by a collision with liquid droplets. The minute liquid droplets accompanying the exhaust gas flow are eliminated by a mist eliminator 8 of an outlet duct 7, and purified processed exhaust gas g2 is raised in temperature by a nonleak-type GGH reheater 9, and is then discharged from the chimney 13.

Here, between the nonleak-type GGH heat recovery unit 5 and nonleak-type GGH reheater 9, a heat medium pipeline 21, an opening/closing valve 22 of this pipeline 21, and a heat medium feeding pump 23 are provided.

The embodiment shown in FIG. 1 and FIG. 2 is characterized in that, between the GGH reheater 9 and mist eliminator 8 provided in the outlet duct 7 at an upstream side of the GGH reheater 9, a blow-off device (one example of the heat suppression device) composed of a blow-off valve 11 and a blow-off pipeline 12 is installed.

System operation is such that, simultaneously with a shutdown of the absorption tower 6 (by a stop of the desulfurization fan 4, the inlet damper 3 and outlet damper 10 are also closed), the blow-off valve 11 is fully opened from a fully closed condition, the processed exhaust gas g2 about to rise in temperature owing to residual heat of a heat medium of the GGH reheater 9 is outwardly discharged at an allowable temperature limit or less of a resin internal component such as an element of the mist eliminator 8 and a corrosion preventive lining material. Owing to the aforementioned installation of a blow-off device, no damage such as thermal deformation, thermal degradation or the like is given to the resin internal component such as an element of the mist eliminator 8 and the corrosion preventive lining material during shutdown of the absorption tower. Accordingly, use of a desulfurizer stable in performance and structure can be realized for a long time.

Herein, although a description has been given of, as the construction of the blow-off device, a combination of the blow-off valve 11 and blow-off pipeline 12 and, as the using method, a method whereby the blow-off valve 11 is fully opened from a fully closed condition simultaneously with a shutdown of the absorption tower 6, the present invention does not limit the model of the blow-off valve 11 or the size or form of the blow-off pipeline 12. In addition, it is sufficient to select the size or the number of installations of the blow-off pipeline(s) 12 with a capacity capable of maintaining an allowable temperature limit or less of nonmetallic material used in the system of the exhaust gas processing device and a model of the blow-off valve 11 with an opening/closing time thereof taken into consideration. In addition, the degree of opening of the blow-off valve 11 can be changed according to the ambient air temperature.

In addition, since no blow-off device exists in an exhaust gas processing device by the conventional formula, it has been necessary to provide, for oxidizing air 15 to be supplied to an oxidizing mixer 14 to obtain high-quality gypsum, as well, a new releasing line to outwardly release the same from the inside of the system during a shutdown of the absorbing tower 6. However, in the above-described embodiment, since the oxidizing air 15 can be outwardly discharged from the inside of the system even during a shutdown of the absorption tower 6 by utilizing the blow-off device composed of the blow-off valve 11 and blow-off pipeline 12, the oxidizing air 15 can be continuously supplied to an adsorption liquid during a shutdown of the absorption tower 6, as well, according to the necessity.

In addition, in place of installing the blow-off device composed of the blow-off valve 11 and blow-off pipeline 12 shown in FIG. 2, a thermometer 18 for measuring the inner ambient air temperature of the outlet duct 7 between the mist eliminator 8 of an outlet portion of the absorption tower 6 and GGH reheater 9, and as shown in FIG. 2, a spray nozzle pipeline 19 for washing a mist eliminator element with a washing liquid is attached to the rear surface and/or front surface of the mist eliminator 8. Spray of this washing liquid makes it possible to wash the inner wall surface of an exhaust gas duct and the periphery thereof.

And, by starting to spray the washing liquid from the spray nozzle pipeline 19 when the thermometer 18 reads a set temperature, the nonmetallic mist eliminator element and the corrosion preventive material of the inner wall surface of the outlet duct 7 and the periphery thereof can be protected.

Figure 3:
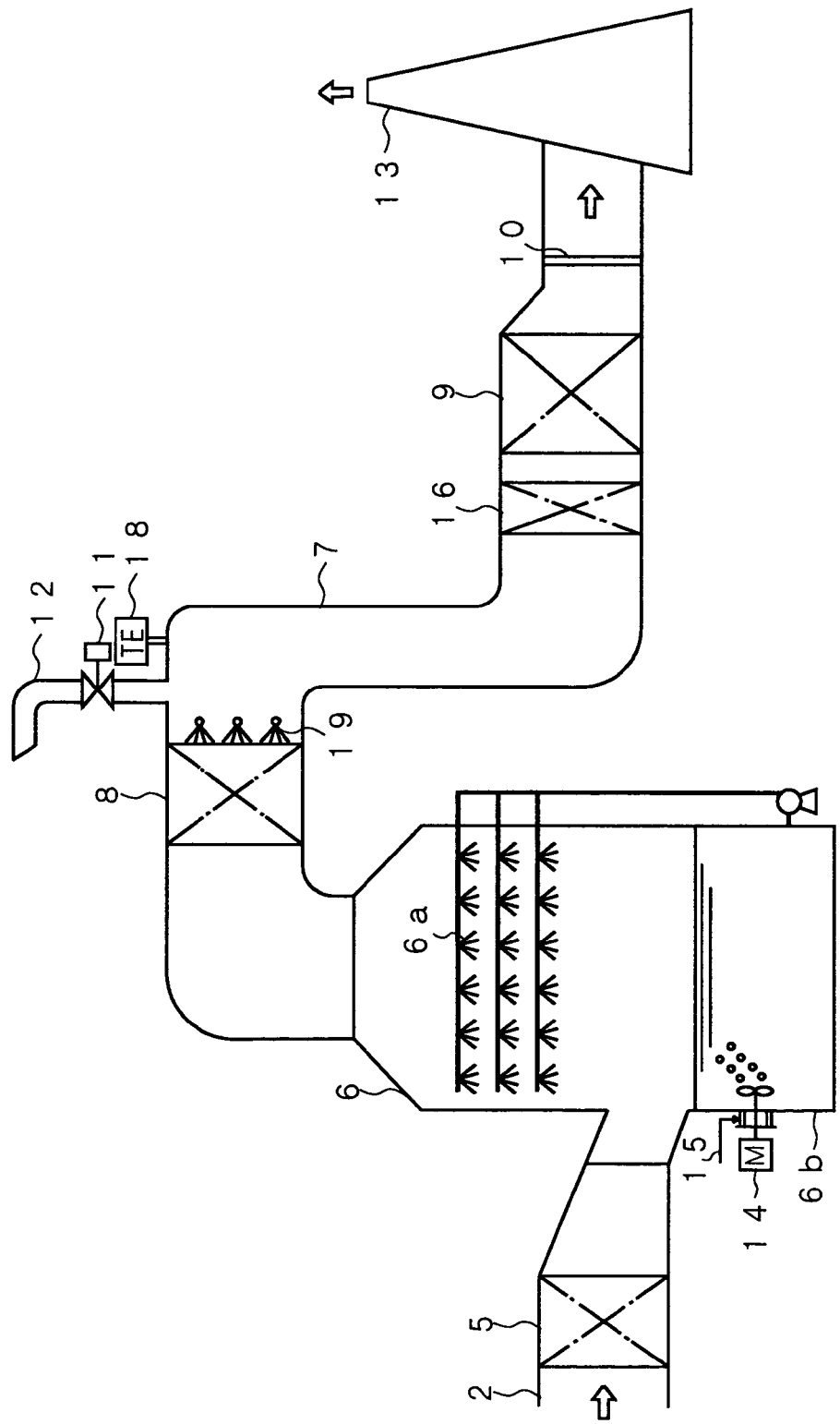
FIG. 3 is a diagram showing an arrangement of the main construction of an exhaust gas processing device of another embodiment of the present invention.
Figure 4:
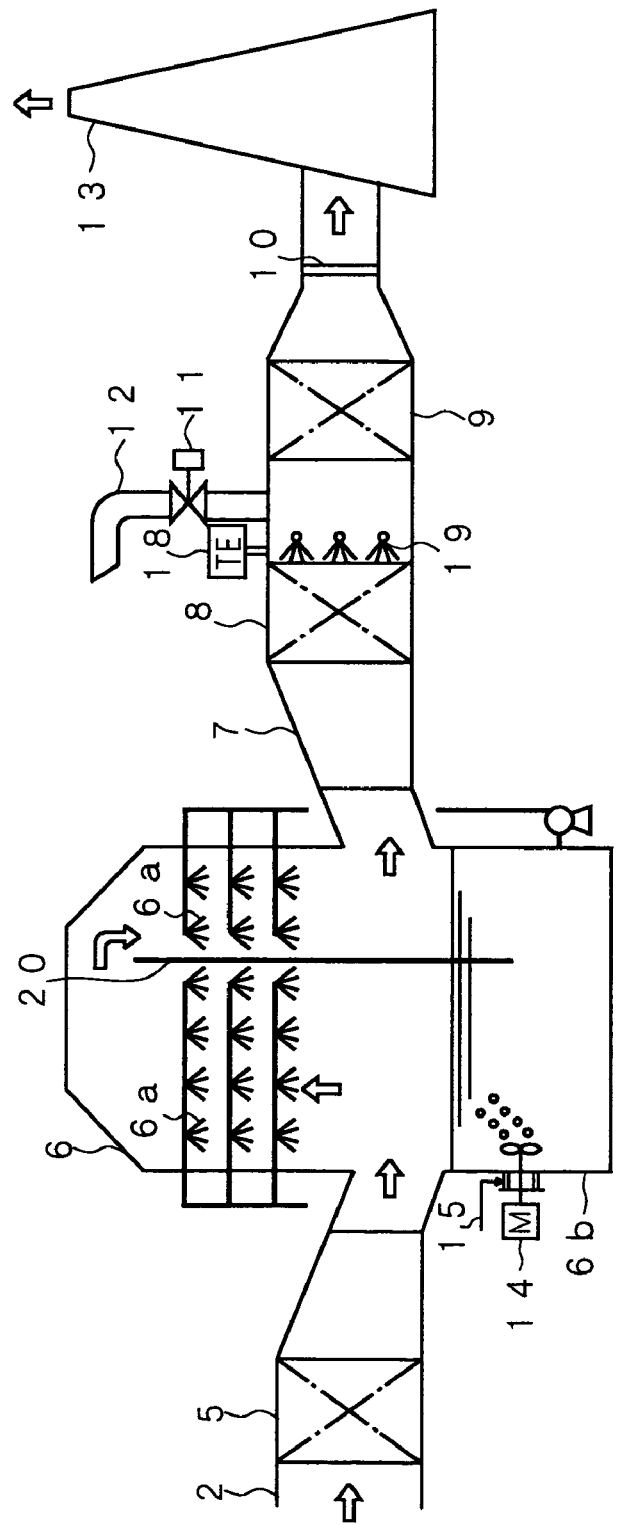
FIG. 4 is a diagram showing an arrangement of the main construction of an exhaust gas processing device of another embodiment of the present invention.
Figure 5:
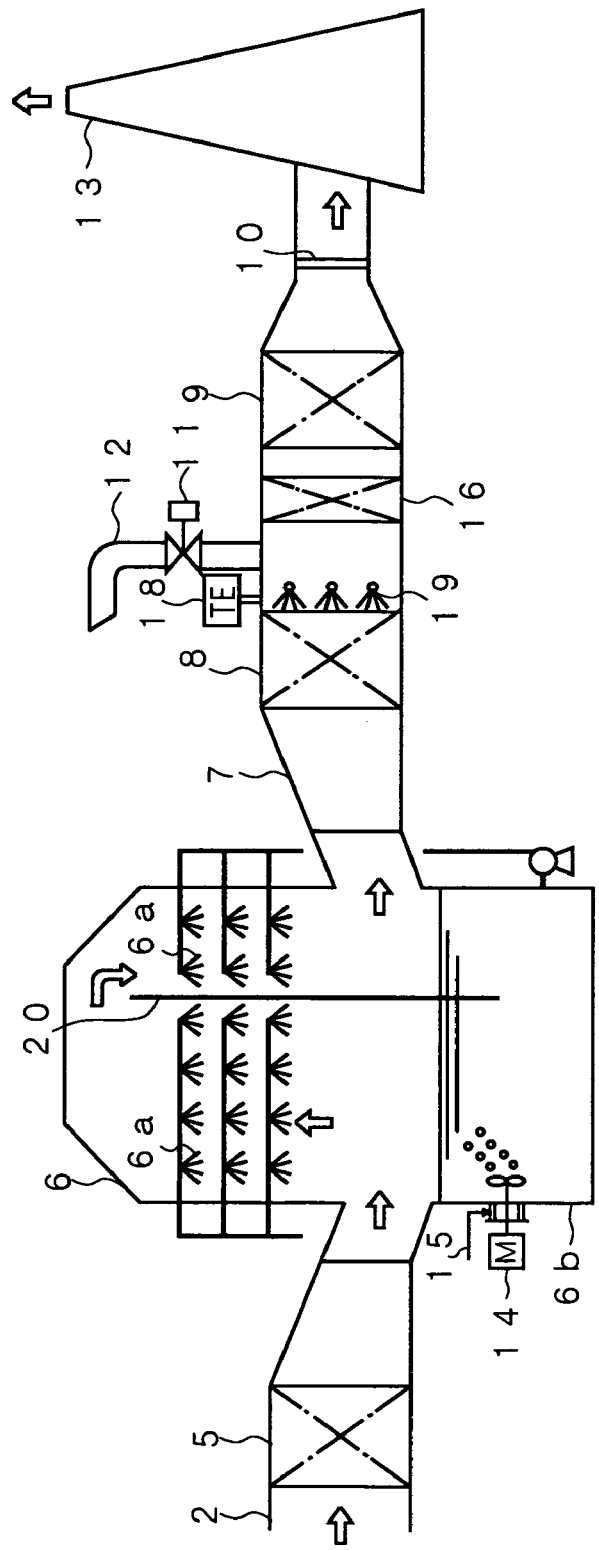
FIG. 5 is a diagram showing an arrangement of the main construction of an exhaust gas processing device of another embodiment of the present invention.

Other embodiments of an exhaust gas processing device of the present invention are shown in FIG. 3-FIG. 5.

Although a desulfurizer provided with a vertical spray-type absorption tower 6 shown in FIG. 3, is the same as the desulfurizer shown in FIG. 2, in order to reduce the heat transfer area of a nonleak-type GGH heat recovery unit 5 and a nonleak-type GGH reheater 9, an embodiment of a construction wherein an SGH (steam-gas heater) 16 is additionally provided at an upstream side of the GGH reheater 9 is shown.

In FIG. 4, shown is an embodiment wherein, in a system provided with, as an absorption tower 6 of a desulfurizer, a return flow spray-type (two-chamber-type) absorption tower having a partition plate 20 to divide a hollow tower portion inside the tower into two, a blow-off device composed of a blow-off valve 11 and a blow-off pipeline 12 is installed in an outlet duct 7 between a GGH reheater 9 and a mist eliminator 8.

Similar to FIG. 4, an embodiment shown in FIG. 5 is also a construction wherein, although this is a construction using a return flow spray-type absorption tower 6, in order to reduce the heat transfer area of a nonleak-type GGH heat recovery unit 5 and a nonleak-type GGH reheater 9, an SGH 16 is additionally provided in an outlet duct 7, which is at an upstream side of the GGH reheater 9.

As described above, in any case of the exhaust gas processing devices shown in FIG. 3-FIG. 5, by installing a blow-off device composed of the blow-off valve 11 and blow-off pipeline 12 in the outlet duct 7 between the nonleak-type GGH reheater 9 and mist eliminator 8 or between the SGH 16 and mist eliminator 8, effects similar to those of the system shown in FIG. 1 and FIG. 2 can be obtained.

Similarly, as another embodiment, also by a construction wherein, without installing the blow-off device composed of the blow-off valve 11 and blow-off pipeline 12 shown in FIG. 3-FIG. 5, in the outlet duct 7 between the mist eliminator 8 of an outlet of the absorption tower 6 and GGH reheater side 9 or the mist eliminator 8 and SGH 16, a thermometer 18 for measuring the ambient air temperature of the inside of this outlet duct is installed, and to the rear surface and/or front surface of the mist eliminator 8, a spray nozzle pipeline 19 for washing a mist eliminator element with a washing liquid and an opening/closing valve (unillustrated) are attached so as to spray the washing liquid from the spay nozzle pipeline 19 at a set temperature, effects the same as those described in terms of the exhaust gas processing device of FIG. 1 and FIG. 2 can be obtained.

Here, in the embodiments of the present invention, the construction of the absorption tower 6 can be of any model, and the model is not particularly limited. In addition, the construction of the GGH reheater 9 is not particularly limited as long as it is a nonleak type, and a GGH reheater of any model can be used.

As still another embodiment of an exhaust gas processing device of the present invention, by a construction wherein, without installing (a) a blow-off device (a blow-off valve 11 and a blow-off pipeline 12) and (b) a thermometer 18 and a mist eliminator washing spray nozzle pipeline 19, on (c) an element of a mist eliminator 8, an absorption tower outlet duct, an exhaust gas duct between the absorption tower 6 and mist eliminator 8, and/or an exhaust gas duct between the mist eliminator 8 and nonleak-type gas-gas heater reheater 9 (in a case of a construction provided with a steam-gas heater 16, an exhaust gas duct between the mist eliminator 8 and steam-gas heater 16, and/or an exhaust gas duct between the steam-gas heater 16 and nonleak-type gas-gas heater reheater 9), a heat-resistant resin material and/or a corrosion preventive lining material resistant to dissipated heat (in a case provided with a steam-gas heater 16, including dissipated heat from the steam-gas heater 16) from the nonleak-type gas-gas heater reheater 9 during a shutdown of the absorption tower 6 is provided, effects the same as those of the construction described in terms of FIG. 1 and FIG. 2 can be obtained. As the heat-resistant resin material of the above-described (c), for example, a polypropylene material or the like is used, and as the corrosion preventive lining material, for example, a glass flake material or the like is used.

Furthermore, of constructions (a)-(c), which are, (a) a construction using the above-described blow-off device (blow-off valve 11 and blow-off pipeline 12), (b) a construction using the thermometer 18 and mist eliminator washing spray nozzle pipeline 19 and an opening/closing valve (unillustrated) of this pipeline, and (c) a construction wherein, on the element of the mist eliminator 8, absorption tower outlet duct, exhaust gas duct between the absorption tower 6 and mist eliminator 8, and/or exhaust gas duct between the mist eliminator 8 and nonleak-type gas-gas heater reheater 9 (in a case of a construction provided with a steam-gas heater 16, the exhaust gas duct between the mist eliminator 8 and steam-gas heater 16, and/or exhaust gas duct between the steam-gas heater 16 and nonleak-type gas-gas heater reheater 9), a heat-resistant resin material and/or a corrosion preventive lining material resistant to dissipated heat (in a case provided with a steam-gas heater 16, including dissipated heat from the steam-gas heater 16) from the nonleak-type gas-gas heater reheater 9 during a shutdown of the absorption tower 6 is provided, by using at least two or more in combination, effects the same as those of the embodiment described in terms of FIG. 1 and FIG. 2 can be obtained.

INDUSTRIAL APPLICABILITY

According to the present invention, by a heat suppression device for suppressing dissipated heat, (1) high-temperature heat of approximately 90-150° C. released from a GGH reheater or an SGH and a GGH reheater is efficiently outwardly discharged during a shutdown of a desulfurizer provided with an absorption tower, or the nonmetallic material of equipment installed in the exhaust gas duct is cooled with a washing liquid, and damage to the inner wall surface of the exhaust gas duct and the internal component of equipment installed in the exhaust gas duct and the corrosion preventing lining material is prevented, whereby long-time stabilized use of a desulfurizer can be realized. (2) In addition, since the heat suppression device can be effectively utilized for supply of oxidizing air during a shutdown of the absorption tower, as well, an additional economic effect is provided.

What is claimed is:

1. An exhaust gas processing device comprising, in order from the upstream side of an exhaust gas flow direction, at least a nonleak-type gas-gas heater heat recovery unit, an absorption tower, a mist eliminator, and a nonleak-type gas-gas heater reheater for circulating a heat medium with respect to the nonleak-type gas-gas heater heat recovery unit arranged in a duct for exhaust gas discharged from a fire furnace, wherein
a heat suppression device for suppressing dissipated heat from the nonleak-type gas-gas heater reheater is arranged in an exhaust gas duct between the mist eliminator and nonleak-type gas-gas heater reheater, the heat suppression device comprising a configuration wherein the exhaust gas duct between the mist eliminator and the nonleak-type gas-gas heater reheater is provided with a blow-off device configured to discharge heated gas from the inside of the exhaust gas duct to the outside of the exhaust gas duct.

2. The exhaust gas processing device as set forth in claim 1, wherein a steam-gas heater is provided in the exhaust gas duct between the mist eliminator and the nonleak-type gas-gas heater reheater, and a heat suppression device for suppressing dissipated heat from the steam-gas heater is provided in the exhaust gas duct between the mist eliminator and the steam-gas heater.

3. The exhaust gas processing device as set forth in claim 2, wherein the heat suppression device further comprises at least one of the following:
a configuration having a thermometer to measure ambient air temperature of the inside of the exhaust gas duct provided in the exhaust gas duct between the mist eliminator and the nonleak-type gas-gas heater reheater, and a spray nozzle pipeline with an opening/closing valve to wash at least one of an element of the mist eliminator and an exhaust gas duct inner wall surface, and the periphery thereof with a washing liquid, the opening/closing valve of the spray nozzle pipeline being activated when the thermometer reads a temperature greater than or equal to a set temperature, the spray nozzle pipeline being provided at at least one of a front surface and a rear surface of the mist eliminator, the front surface of the mist eliminator being contacted by exhaust gas before the rear surface of the mist eliminator is contacted by the exhaust gas; and
a configuration wherein at least one of a heat-resistant resin material and a corrosion preventive lining material resistant to dissipated heat from the nonleak-type gas-gas heater reheater during a shutdown of the absorption tower is provided on at least one of an element of the mist eliminator, an absorption tower outlet duct, an exhaust gas duct between the absorption tower and mist eliminator, and an exhaust gas duct between the mist eliminator and the nonleak-type gas-gas heater reheater.

4. The exhaust gas processing device as set forth in claim 1, wherein
the absorption tower is a two-chamber-type absorption tower provided with
(a) a circulation tank for retaining of an absorption liquid, and
(b) spray nozzles in respective regions, while an inlet duct for introducing exhaust gas discharged from a combustion device such as a boiler in a generally horizontal direction and an outlet duct for discharging exhaust gas in a generally horizontal direction are provided above the circulation tank, an exhaust gas channel is provided between the inlet duct and outlet duct, a partition plate extending in a vertical direction having an opening portion at a ceiling portion side to divide the exhaust gas channel into two chambers of an inlet duct side and an outlet duct side is provided, and an ascending current region where exhaust gas introduced from the inlet duct flows upward and a descending current region where exhaust gas flows downward toward the outlet duct after reversing at the opening portion of the ceiling side are formed by the partition plate, so that an ejecting absorption liquid slurry makes countercurrent contact with exhaust gas in the ascending current region and makes parallel-current contact in the descending current region.

5. The exhaust gas processing device as set forth in claim 1, wherein the heat suppression device further comprises at least one of the following:

a configuration having a thermometer to measure ambient air temperature of the inside of the exhaust gas duct provided in the exhaust gas duct between the mist eliminator and the nonleak-type gas-gas heater reheater, and a spray nozzle pipeline with an opening/closing valve to wash at least one of an element of the mist eliminator and an exhaust gas duct inner wall surface, and the periphery thereof with a washing liquid, the opening/closing valve of the spray nozzle pipeline being activated when the thermometer reads a temperature greater than or equal to a set temperature, the spray nozzle pipeline being provided at at least one of a front surface and a rear surface of the mist eliminator, the front surface of the mist eliminator being contacted by exhaust gas before the rear surface of the mist eliminator is contacted by the exhaust gas; and a configuration wherein at least one of a heat-resistant resin material and a corrosion preventive lining material resistant to dissipated heat from the nonleak-type gas-gas heater reheater during a shutdown of the absorption tower is provided on at least one of an element of the mist eliminator, an absorption tower outlet duct, an exhaust gas duct between the absorption tower and mist eliminator, and an exhaust gas duct between the mist eliminator and the nonleak-type gas-gas heater reheater.

6. A method for using an exhaust gas processing device including, in order from the upstream side of an exhaust gas flow direction, at least a nonleak-type gas-gas heater heat recovery unit, an absorption tower, a mist eliminator, and a nonleak-type gas-gas heater reheater for circulating a heat medium with respect to the heat recovery unit arranged in a duct for exhaust gas discharged from a fire furnace, wherein a heat suppression device for suppressing dissipated heat from the nonleak-type gas-gas heater reheater is arranged in an exhaust gas duct between the mist eliminator and nonleak-type gas-gas heater reheater, the method comprising activating the heat suppression device to suppress dissipated heat from the nonleak-type gas-gas heater reheater generated during a shutdown of the adsorption tower.

7. A method for using an exhaust gas processing device including, in order from the upstream side of an exhaust gas flow direction, at least a nonleak-type gas-gas heater heat recovery unit, an absorption tower, a mist eliminator, and a nonleak-type gas-gas heater reheater for circulating a heat medium with respect to the heat recovery unit arranged in a duct for exhaust gas discharged from a fire furnace, wherein a heat suppression device for suppressing dissipated heat from the nonleak-type gas-gas heater reheater is arranged in an exhaust gas duct between the mist eliminator and nonleak-type gas-gas heater reheater, the method comprising measuring a temperature of inner ambient air of the exhaust gas flow passage between the mist eliminator and the nonleak-type gas-gas heater reheater, and then washing the element of the mist eliminator and the periphery thereof when the measured temperature becomes greater or equal to a set value during a shutdown of the adsorption tower.

* * * * *